(12) United States Patent
Agarwalla et al.

(10) Patent No.: US 10,565,444 B2
(45) Date of Patent: *Feb. 18, 2020

(54) USING VISUAL FEATURES TO IDENTIFY DOCUMENT SECTIONS

(71) Applicant: INTERNATIONAL BUSINESS MACHINES CORPORATION, Armonk, NY (US)

(72) Inventors: Lalit Agarwalla, Bangalore (IN); Rizwan Dudekula, Bangalore (IN); Purushothaman K. Narayanan, Bangalore (IN); Sujoy Sett, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/698,212

(22) Filed: Sep. 7, 2017

(65) Prior Publication Data

US 2019/0073528 A1    Mar. 7, 2019

(51) Int. Cl.
   *G06K 9/00*    (2006.01)
   *G06K 9/62*    (2006.01)
   *G06K 9/34*    (2006.01)

(52) U.S. Cl.
   CPC ..... *G06K 9/00469* (2013.01); *G06K 9/00456* (2013.01); *G06K 9/34* (2013.01); *G06K 9/6256* (2013.01); *G06K 9/6261* (2013.01)

(58) Field of Classification Search
   CPC ....... G06K 2009/6213; G06K 9/00456; G06K 9/00463; G06K 9/00469; G06K 9/00483;
   (Continued)

(56) References Cited

U.S. PATENT DOCUMENTS

| 6,895,552 B1 | 5/2005 | Balabanovic et al. |
| 9,317,777 B2 | 4/2016 | Kaasila et al. |

(Continued)

OTHER PUBLICATIONS

IBM, "List of IBM Patents or Patent Applications Treated as Related (Appendix P)," Apr. 13, 2018, p. 1-2.

(Continued)

*Primary Examiner* — Kim Y Vu
*Assistant Examiner* — Michael J Vanchy, Jr.
(74) *Attorney, Agent, or Firm* — Nicole A. Spence

(57) ABSTRACT

A method, computer system, and a computer program product for identifying sections in a document based on a plurality of visual features is provided. The present invention may include receiving a plurality of documents. The present invention may also include extracting a plurality of content blocks. The present invention may further include determining the plurality of visual features. The present invention may then include grouping the extracted plurality of content blocks into a plurality of categories. The present invention may also include generating a plurality of closeness scores for the plurality of categories by utilizing a Visual Similarity Measure. The present invention may further include generating a plurality of Association Matrices on the plurality of categories for each of the received plurality of documents based on the Visual Similarity Measure. The present invention may further include merging the plurality of categories into a plurality of clusters.

18 Claims, 10 Drawing Sheets

(58) Field of Classification Search
CPC ...... G06K 9/34; G06K 9/6256; G06K 9/6261; G06K 9/6828
See application file for complete search history.

(56) References Cited

U.S. PATENT DOCUMENTS

| | | | | |
|---|---|---|---|---|
| 10,049,270 | B1* | 8/2018 | Agarwalla | G06K 9/00463 |
| 2006/0136478 | A1 | 6/2006 | Berkner | |
| 2007/0168856 | A1 | 7/2007 | Berkner | |
| 2008/0294651 | A1* | 11/2008 | Masuyama | G06K 9/6219 |
| 2008/0313031 | A1 | 12/2008 | Li | |
| 2013/0064444 | A1 | 3/2013 | Gordo | |
| 2013/0129143 | A1 | 5/2013 | Chen | |
| 2014/0164297 | A1 | 6/2014 | Deolalikar | |
| 2015/0019204 | A1 | 1/2015 | Simard | |
| 2015/0134304 | A1* | 5/2015 | Guiver | G06N 7/00 703/2 |
| 2015/0278167 | A1 | 10/2015 | Arnold et al. | |
| 2016/0085731 | A1 | 3/2016 | Bruno et al. | |
| 2016/0103823 | A1 | 4/2016 | Jackson, Jr. | |
| 2016/0124922 | A1 | 5/2016 | Wu et al. | |
| 2016/0162456 | A1 | 6/2016 | Munro | |
| 2016/0217343 | A1* | 7/2016 | Hoffman | G06K 9/6215 |

OTHER PUBLICATIONS

Agarwalla et al., "Using Visual Features to Identify Document Sections," Application and Drawings, Filed on Dec. 29, 2017, 54 Pages, U.S. Appl. No. 15/857,682.

IBM, "Document Conversion," IBM Watson Developer Cloud, p. 1-3, https://www.ibm.com/watson/developercloud/document-conversion.html, Accessed on Jun. 29, 2017.

Manabe et al., "Extracting Logical Hierarchical Structure of HTML Documents Based on Headings," Proceedings of the VLDM Endowment, Aug. 31-Sep. 4, 2015, p. 1606-1617, vol. 8, No. 12, Kohala Coast, Hawaii.

Mell et al., "The NIST Definition of Cloud Computing," National Institute of Standards and Technology, Sep. 2011, p. 1-3, Special Publication 800-145.

Vanderbeck et al., "A Machine Learning Approach to Identifying Sections in Legal Briefs," 22nd Midwest Artificial Intelligence and Cognitive Science Conference (MAICS 2011), Apr. 16-17, 2011, 7 Pages, Cincinnati, Ohio, USA.

\* cited by examiner

USING VISUAL FEATURES TO IDENTIFY DOCUMENT SECTIONS

BACKGROUND

The present invention relates generally to the field of computing, and more particularly to computational linguistics.

Human vision is accustomed to various formatting in text, created with various intentions, such as to gather the viewer's attention to some summarized information, to highlight or specially relate some sections with others, and to create information hierarchy within the document. As such, small changes in font size, boldface, italics or color is often intended to highlight a section, and does not necessarily represent a significant change in context.

SUMMARY

Embodiments of the present invention disclose a method, computer system, and a computer program product for identifying sections in a document based on a plurality of visual features. The present invention may include receiving a plurality of documents. The present invention may also include extracting a plurality of content blocks based on the received plurality of documents by utilizing an external extracting engine. The present invention may further include determining the plurality of visual features based on the extracted plurality of content blocks. The present invention may then include grouping the extracted plurality of content blocks into a plurality of categories based on the determined plurality of visual features. The present invention may also include generating a plurality of closeness scores for the grouped plurality of categories by utilizing a Visual Similarity Measure. The present invention may further include generating a plurality of Association Matrices associated with the grouped plurality of categories for each of the received plurality of documents based on the Visual Similarity Measure. The present invention may further include merging the grouped plurality of categories into a plurality of clusters.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
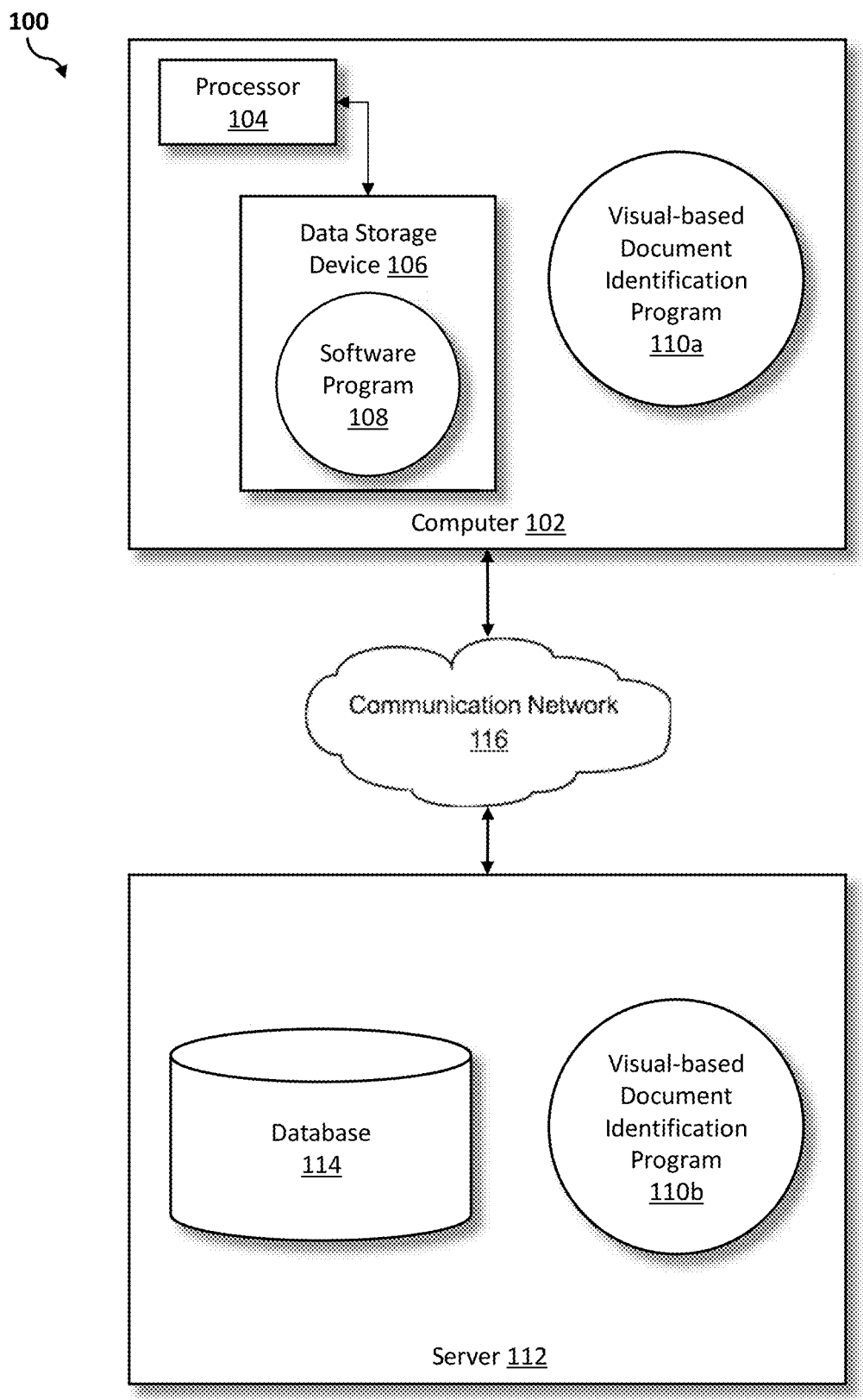
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for identifying sections in documents, including PDF documents, using visual features. As such, the present embodiment has the capacity to improve the technical field of computational linguistics by dividing the document into content blocks, comparing each content block based on visual features, identifying clusters of similar content blocks using a Visual Similarity Measure, and deriving a linked hierarchical information tree of sections in the PDF document. More specifically, the visual-based document identification program may receive a document entered by a user. The visual-based document identification program may then extract content blocks from the received document by utilizing a known external extraction engine, determine the visual features for each extracted content block, and group the extracted content blocks into content block categories. The visual-based document identification program may then generate an Association Matrix to fill in the closeness scores generated by a Visual Similarity Measure. Based on the closeness scores generated by the Visual Similarity Measure, the visual-based document identification program may then merge the content block categories into clusters. The visual-based document identification program may then segregate the content blocks from the clusters, and obtain a hierarchy of the clusters (i.e., hierarchical information) from a hierarchical prediction model. Then, the sequence of the extracted content blocks and the hierarchical information may be utilized to generate a linked hierarchical information tree to identify the sections, and their relationship with each other, for a received document.

As described previously, human vision is accustomed to various formatting in text, created with various intentions, such as to gather the viewer's attention to some summarized information, to highlight or specially relate some sections with others, and to create information hierarchy within the document. As such, small changes in font size, boldface, italics or color is often intended to highlight a section, and does not necessarily represent a significant change in context.

Therefore, it may be advantageous to, among other things, provide a method, computer system or computer program product for identifying sections in documents, including Portable Document Format (PDF) documents, by relating segments of information and creating a relationship (e.g., hierarchy or graph) between these segments based on visual closeness or difference. The visual-based document identification program may automatically split documents into smaller sections without the need of manual configurations and identify a hierarchy of sections in the document to assist with understanding relationships between the sections.

According to at least one embodiment, the visual-based document identification program may utilize the sequence of the content blocks, visual characteristics of the clusters associated with each sequence of the content blocks, and relative comparison of the clusters to generate a linked hierarchical information tree. The linked hierarchical information tree may express an alternate representation of the information from a document that may assist in relating and searching for information in a cognitive way, similar to a human counterpart.

According to at least one embodiment, sections may be identified by extracting contents between two headings found in the document. The headings may be marked using distinctive markups in hypertext markup language (HTML) (e.g., H1, H2, H3) and text file documents (e.g., Heading 1, Heading 2 styles). However, no clear markup or tagging may be used to distinguish normal text compared to headings in PDF documents. The text and graphics maintained in PDF documents may be based on image model with the appearance of a printed page thereby ensuring device/resolution is independent and enabling the document to be reliably printed anywhere.

According to at least one embodiment, the visual-based document identification program may include three parts: (1) partitioning document into content blocks, and then identifying and marking visual features for each block; (2) identifying clusters of similar content blocks using a Visual Similarity Measure; and (3) deriving a linked hierarchical information tree of sections in the document.

According to at least one embodiment, the visual-based document identification program may extract content blocks in documents (e.g., paragraphs and images), and determine the visual features for the extracted content blocks. The visual similarity of content blocks in a document may be utilized to identify headings and sections. The visual-based document identification program may then determine the extracted content blocks with identical visual features and group the blocks into distinct content block categories (e.g., categories) and may create an Association Matrix to organize the closeness for the content block categories. The visual-based document identification program may then utilize a Visual Similarity Measure (e.g., mathematical equation that compares the closeness between two categories and computes a closeness score) to determine the closeness scores (e.g., values) in the Association Matrix and to perform an unsupervised non-linear clustering utilizing the Visual Similarity Measure. The generated clusters may be utilized to segregate the extracted content blocks based on their visual features. The generated clusters may then be tagged by matching against a pre-trained model (i.e., hierarchical prediction model). The sequential positioning and clustering of the extracted content blocks may create a linked hierarchy representation of the document content (i.e., linked hierarchical information tree).

According to at least one embodiment, the visual-based document identification program may utilize an automated mechanism to identify sections in documents using visual features in which a minor change in font style, bold face, or color may make text easily noticeable as opposed to a heading or reference to other section of information. To the contrary, a mistake in font style or color, whether intentional or accidental, may not be important enough that the text may be partitioned into different sections.

According to at least one embodiment, while numeric attributes (e.g., font size, line spacing, character spacing) and Boolean attributes (e.g., bold, italic, underline) may be easily differentiated, other visual notions (e.g., color, font face) may be too complicated to differentiate with a degree of similarity or dissimilarity. Even if algorithms are defined to differentiate between individual attributes, the impact of the combination of attributes may inflict upon human recognition may be hard to mimic in computing devices.

According to at least one embodiment, the Visual Similarity Measure may be utilized to compute the closeness score between two content block categories based on the color, font size and font type for each content block category. The Visual Similarity Measure may analyze the similarities of the color, font size and font type associated with two categories to obtain a closeness score. The Visual Similarity Measure may utilize a known external color comparison engine (e.g., CIELAB, CIE94 and CIEDE2000) to obtain the similarity between two colors within the content block categories. The Visual Similarity Measure may utilize a known external font size extraction engine to extract the "point" measure associated with the font size for each content block category. To determine font similarity, a known external font extraction engine may be utilized to sample out the individual alpha-numerals, to change the scale of the individual alpha-numerals into the same point size, to crop the boundaries and convert the content of the categories to grayscale, to apply key-matching approach (e.g., utilizing known algorithms to transform a key into an uniform representation of the key at the equal size) or Histogram matching approach (e.g., utilizing known algorithms to transform an image into a uniform representation of the image of equal size) to determine similarity between the categories, and to average out the similarities and dissimilarities between the alpha-numerals.

According to at least one embodiment, the Visual Similarity Measure may be utilized to obtain the closeness score. First, the visual attributes may be partitioned into two types: numerical and categorical. If the visual attributes are numerical attributes, then, known measures, such as Euclidean distance, Minkowski distance or Mahalanobis distance, may be utilized to unify the similarities and dissimilarities between the numerical attributes. If, however, the visual attributes are categorical attributes, then the categorical visual attributes may be partitioned into two types, binary (e.g., whether the visual attributes include bullets or numbering) or multinary (e.g., the type of alignment or justification included in the visual attributes). If the categorical visual attributes are binary categorical attributes, then matching or Jaccard coefficient may be utilized to unify the similarities and dissimilarities between the binary categorical attributes. If, however, the categorical attributes are multinary categorical attributes, then the multinary categorical attributes may be mapped to multiple dummy binary variables and a known hamming distance is utilized to unify the similarities and dissimilarities between the multinary categorical attributes. Then, the similarities and dissimilarities of the visual attributes, regardless of whether the visual attributes are categorical (binary or multinary) or numerical, may be computed to generate an overall score. The overall score may be normalized into one single range, and the weight may be calculated as the standard deviation of numerical attributes.

According to at least one embodiment, the linked hierarchical information tree may be created based on the relative cluster font size, location of the cluster, and the positional alignment of the cluster (e.g., evaluating indentation using x-coordinate, width). The relative cluster font size may be utilized to determine the level order of the clusters. The sequence of the clusters may be utilized to determine the horizontal positioning of content blocks in the hierarchical information tree. The position of the cluster in the complete document may be utilized to determine the connection between the content blocks across levels of the hierarchical information tree.

According to at least one embodiment, the visual-based document identification program may be utilized to prepare answer units for Question-Answering systems. Question-Answering systems may provide answers relevant to a question based on a corpus of documents. The sections of the document may be presented to the user as concise answer units, which may avoid very long answer units and ensure search engines understand the context of a section content using the headings. In the present embodiment, the visual-based document identification program may automatically split the documents into sections for purposes like preparing answer units, even if the headings are not distinctively marked-up as headings.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visual-based document identification program 110a. The networked computer environment 100 may also include a server 112 that is enabled to run a visual-based document identification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the visual-based document identification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the visual-based document identification program 110a, 110b (respectively) to identify sections in PDF documents using visual features. The visual-based document identification method is explained in more detail below with respect to FIGS. 2-7.

Figure 2:
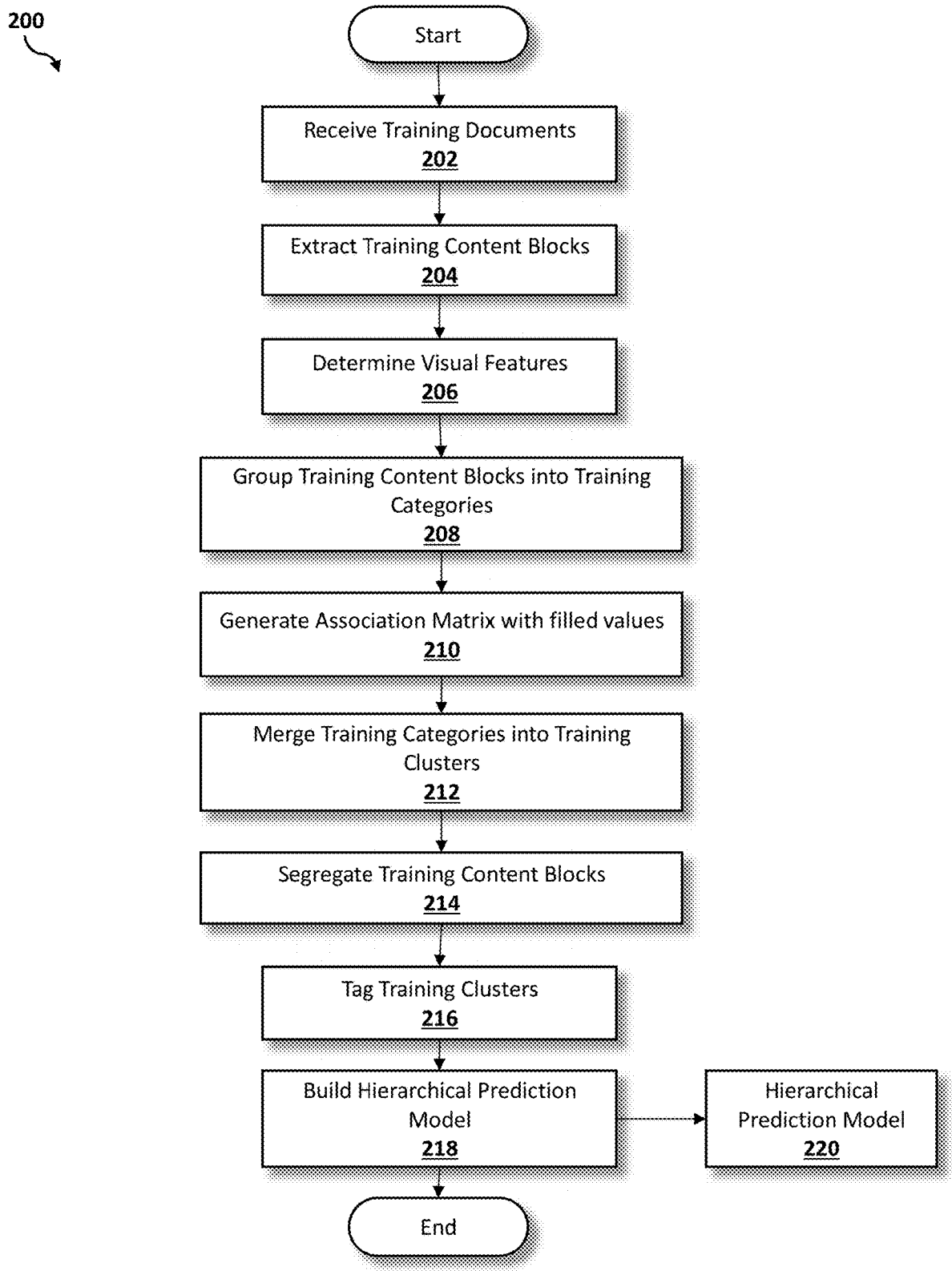
FIG. 2 is an operational flowchart illustrating a process for building a hierarchical prediction model for predicting cluster hierarchical information according to at least one embodiment.

Referring now to FIG. 2, an operational flowchart illustrating the exemplary hierarchical prediction model building process 200 for predicting cluster hierarchical information used by the visual-based document identification program 110a and 110b according to at least one embodiment is depicted.

At 202, the training document is received into the visual-based document identification program 110a, 110b by the user. Using a software program 108 on the user's device (e.g., user's computer 102), at least one training document may be received as input into the visual-based document identification program 110a, 110b. The training document (e.g., emails, publications, instruction manuals, brochures), expressed in natural language, may be in PDF format. The document may be uploaded into the visual-based document identification program 110a, 110b to extract the training content blocks in the received training document.

The document may be, for example, a letter, which is uploaded as a training document into visual-based document identification program 110a, 110b. The following Table 1 shows the text from the uploaded letter:

TABLE 1

Dear Sir/Madam:
This email is to inform you that I recently elected as the treasurer of the New York City Arbor Club.
As such, all correspondence related to the open checking accounts should be sent to my attention at our new office address:
        New York City Arbor Club
        589 Broadway, 18$^{th}$ Floor
        New York, NY 10017
However, any correspondence related to the Money Market account or any other investment accounts should be sent to the President of the New York City Arbor Club as well as myself at the above new office address.
Should you have any questions, please feel free to contact me.
Thank you for your cooperation and prompt attention to this matter!

Next, at 204, the training content blocks in the training document are extracted from the received training document. The training content blocks may include textual data (e.g., paragraphs, sections, captions, subtitles) and certain visual data (e.g., images, tables). The visual-based document identification program 110a, 110b may extract the training content blocks by utilizing a known external extraction engine.

Continuing the previous example, the content blocks (e.g., TB1, TB2, TB3, TB4, TB5 and TB6) are extracted from the letter provided as a training document. The following Table 2 shows the content blocks extracted from the received letter:

TABLE 2

| |
|---|
| Dear Sir/Madam: } TB1 |
| This email is to inform you that I recently elected as the treasurer of the New York City Arbor Club. As such, all correspondence related to the open checking accounts should be sent to my attention at our new office address: } TB2 |
| New York City Arbor Club<br>589 Broadway, 18$^{th}$ Floor } TB3<br>New York, NY 10017 |
| However, any correspondence related to the Money Market account or any other investment accounts should be sent to the <u>President of the New York City Arbor Club as well as myself</u> at the above new office address. } TB4 |
| Should you have any questions, please feel free to contact me. } TB5 |
| Thank you for your cooperation and prompt attention to this matter! } TB6 |

Then, at 206, the visual features for the extracted training content blocks are determined. Visual features (i.e., training visual features) may include various visual attributes related to the textual and visual data (e.g., color, illumination, font size, font type and justification) included within each extracted training content block. The visual-based document identification program 110a, 110b may utilize a known visual feature extraction engine to determine the visual features associated with each extracted training content block. The visual-based document identification program 110a, 110b may determine the differences between the visual features present in each of the extracted content blocks. The visual-based document identification program 110a, 110b may compile the visual features for each training content block into a list, which may be utilized to distinguish each training content block from another training content block and to determine whether training content blocks are similar.

Continuing the previous example, the visual-based document identification program 110a, 110b determines the visual features for each of the extracted training content blocks (e.g., TB1, TB2, TB3, TB4, TB5 and TB6). The following Table 3 shows the list of visual features for the extracted training content blocks:

TABLE 3

| | |
|---|---|
| TB1 | Times New Roman, Font size: 10, Color: Black, Left Alignment, Bold |
| TB2 | Times New Roman, Font size: 10, Color: Black, Left Alignment |
| TB3 | Times New Roman, Font size: 10, Color: Black, Center Alignment |
| TB4 | Times New Roman, Font size: 10, Color: Black, Left Alignment, partially underlined |
| TB5 | Times New Roman, Font size: 10, Color: Black, Left Alignment |
| TB6 | Times New Roman, Font size: 10, Color: Black, Left Alignment, Bold |

Then, at 208, the training content blocks are grouped into training content block categories (e.g., training categories). The visual-based document identification program 110a, 110b may determine which of the training content blocks include identical visual features. The training content blocks with identical visual features may be grouped together into training categories by the visual-based document identification program 110a, 110b. Based on the visual features for each extracted training content block, the extracted training content blocks may be divided into distinct training categories. The extracted training content blocks with identical visual features may be grouped into the same training category, and extracted training content blocks with different visual features may be grouped into different training categories.

Continuing the previous example, the visual-based document identification program 110a, 110b determines which of the extracted training content blocks (e.g., TB1, TB2, TB3, TB4, TB5 and TB6) include identical visual features. Based on the above Table 3 generated by the visual-based document identification program 110a, 110b, both TB2 and TB5 include identical visual features, which is Times New Roman, Font size: 10, Color: Black, Left Alignment, and both TB1 and TB6 include identical visual features, which is Times New Roman, Font size: 10, Color: Black, Left Alignment, Bold. Therefore, the visual-based document identification program 110a, 110b groups TB2 and TB5 into one training category, and TB1 and TB6 into another training category. The following Table 4 shows the new training categories grouped from the identical extracted training content blocks:

TABLE 4

| |
|---|
| Dear Sir/Madam: } TC1 |
| This email is to inform you that I recently elected as the treasurer of the New York City Arbor Club. As such, all correspondence related to the open checking accounts should be sent to my attention at our new office address: } TC2 |
| New York City Arbor Club<br>589 Broadway, 18$^{th}$ Floor } TC3<br>New York, NY 10017 |
| However, any correspondence related to the Money Market account or any other investment accounts should be sent to the <u>President of the New York City Arbor Club as well as myself</u> at the above new office address. } TC4 |
| Should you have any questions, please feel free to contact me. } TC2 |
| Thank you for your cooperation and prompt attention to this matter! } TC1 |

Then, at 210, the Association Matrix with filled values is generated. The Association Matrix (i.e., training Association Matrix) may include the comparison between the training categories based on the closeness score for each training category which is generated by the Visual Similarity Measure. The closeness score may be associated to the closeness of the two compared training categories. The closeness scores generated by the comparison of two categories may be filled into the generated Association Matrix as values. Further details on the generation of the closeness scores from the Visual Similarity Measure will be included below with respect to FIG. 6.

Continuing the previous example, the four (e.g., TC1, TC2, TC3 and TC4) categories and the visual features were utilized by the Visual Similarity Measure to generate a closeness score for each of the cluster comparisons. The closeness scores are then placed into the Association Matrix at the respective boxes. The block diagram of the exemplary Association Matrix of the training content block categories with the closeness score generated by the Visual Similarity Measure will be described in greater detail below with respect to FIG. 3.

Then, at 212, the training categories are merged into training clusters. The visual-based document identification program 110a, 110b may perform an unsupervised non-linear clustering to group certain training categories into training clusters based on the closeness score generated by the Visual Similarity Measure. Prior to the start of the visual-based document identification program 110a, 110b, the user may set a threshold value to merge training categories that satisfy the threshold value. For example, at the bottom of the screen, there may be a "Threshold" button, when the user clicks on that "Threshold" button, the user may be prompted (via dialog box) to input a threshold value from 1-100, or another range of normalized numbers. Any number entered in the dialog box may be the threshold value in which a closeness score equal to or greater than that entered threshold value may be merged into a training cluster. As such, the extracted training content blocks may now be mapped into training clusters that show the logical similarities between extracted training content blocks.

Continuing the previous example, the visual-based document identification program 110a, 110b performs the unsupervised non-linear clustering to merge certain training categories. The user predetermined that training category comparisons with a threshold value of 75 or greater will merge into a training cluster. Based on the Association Matrix, TC2 and TC3 generates a closeness score of 75, which satisfies the threshold value. As such, TC2 and TC3 are merged to form one training cluster. The following Table 5 shows the newly formed training clusters based on the closeness scores generated by the Visual Similarity Measure:

TABLE 5

| | |
|---|---|
| Dear Sir/Madam: } Training Cluster 1 | |
| This email is to inform you that I recently elected as the treasurer of the New York City Arbor Club. As such, all correspondence related to the open checking accounts should be sent to my attention at our new office address: | } Training Cluster 2 |
| New York City Arbor Club<br>589 Broadway, 18$^{th}$ Floor<br>New York, NY 10017 } Training Cluster 2 | |
| However, any correspondence related to the Money Market account or any other investment accounts should be sent to the <u>President of the New York City Arbor Club as well as myself</u> at the above new office address. | } Training Cluster 3 |
| Should you have any questions, please feel free to contact me. } Training Cluster 2 | |
| Thank you for your cooperation and prompt attention to this matter! } Training Cluster 1 | |

Then, at 214, the training content blocks are segregated based on the visual features. The visual-based document identification program 110a, 110b may segregate the extracted training content blocks included in each training cluster based on the visual features of the extracted training content blocks.

Continuing the previous example, the visual-based document identification program 110a, 110b segregates the extracted training content blocks from each of the three training clusters. As such, TB1 and TB6 are segregated from Training Cluster 1, TB2, TB3 and TB5 are segregated from Training Cluster 2, and TB4 is segregated from Training Cluster 3.

Then, at 216, tags are placed on the training clusters. The visual-based document identification program 110a, 110b may manually tag the training clusters with visually enforced hierarchy information. The visually enforced hierarchy information may include a hierarchy scale that may range from 0 (e.g., the least prominent text or image or footer block) to 1 (e.g., the cluster containing the most prominent header or title blocks) for each training cluster.

Continuing the previous example, the user manually places tags on the three training clusters (e.g., Training Cluster 1, Training Cluster 2 and Training Cluster 3) associated with the six associated training content blocks (e.g., TB1, TB2, TB3, TB4, TB5 and TB6). The tags ranging from 0 to 1 are based on which of the training clusters include the most or least prominent texts. The user manually tags the training clusters as follows: Training Cluster 1=0.9; Training Cluster 2=0.6; and Training Cluster 3=0.7.

Then, at 218, the tagged training data (e.g., training cluster tags, closeness scores of the training categories, associated training content blocks and visual features of each training content block) is entered as input to build a machine learning and prediction algorithm (e.g., hierarchical training model) 220. The hierarchical training model 220 may utilize a known algorithm to generate as an output the hierarchical sequencing of the training clusters for the received training document. The algorithm (e.g., ordinal logistic regression, apriori algorithms or tuned decision trees) may be utilized to determine the position of one training cluster depending on the presence and nature of the other training clusters from the same training document. With the hierarchical sequencing of the training clusters and the sequencing positioning of the extracted training content blocks, the visual-based document identification program 110a, 110b may be able to create a linked hierarchical information tree that illustrates the hierarchical and sequential connections between the extracted training content blocks.

Continuing the previous example, the tagged training data is entered as input into the hierarchical training model 220, and the output of the hierarchical training model 220 is hierarchy of the clusters (i.e., hierarchical information) that may be used to generate a linked hierarchical information tree. The hierarchical training model 220 determines that the hierarchical sequencing of the clusters (from top to bottom) is Training Cluster 1, Training Cluster 3 and Training Cluster 2. TB2, TB3 and TB5 are sequentially connected, TB1 and TB6 are sequentially connected, TB1 and TB4 are hierarchically connected, TB6 and TB4 are hierarchically connected, TB2 and TB4 are hierarchically connected, and TB5 and TB4 are hierarchically connected.

Figure 3:
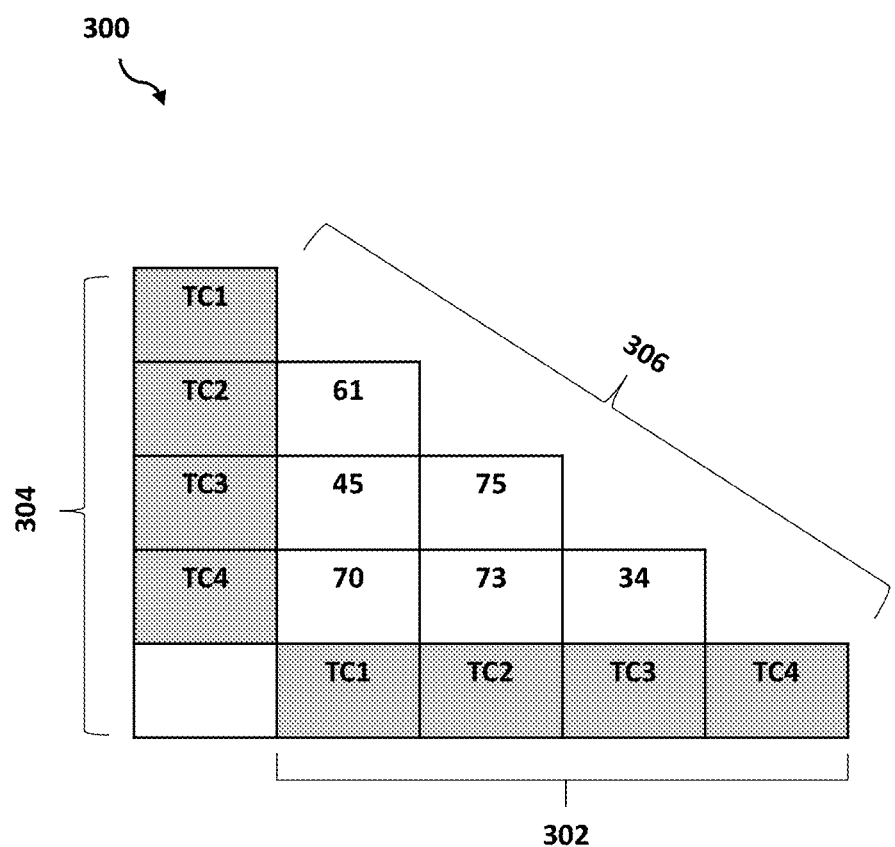
FIG. 3 is a block diagram of an exemplary Association Matrix for the training content block categories with the closeness score generated by the Visual Similarity Measure according to at least one embodiment.

Referring now to FIG. 3, a block diagram of an exemplary Association Matrix of the training content block categories with the closeness score generated by the Visual Similarity Measure 300 used by the visual-based document identification program 110a and 110b according to at least one embodiment is depicted. As shown in FIG. 3, the individual training categories (e.g., TC1, TC2, TC3 and TC4) are listed at x-axis 302 and y-axis 304 of the Association Matrix, and the closeness score for the respective training categories are included in the remaining boxes 306 of the Association Matrix.

The closeness score between TC2 and TC3 is 75, which is determined by finding the TC2 on the x-axis 302 and the TC3 on the y-axis 304, and follow each until x-axis 302 and y-axis 304 intersect. The closeness score presented at the intersection, 75, is the closeness score for TC2 and TC3.

Figure 4:
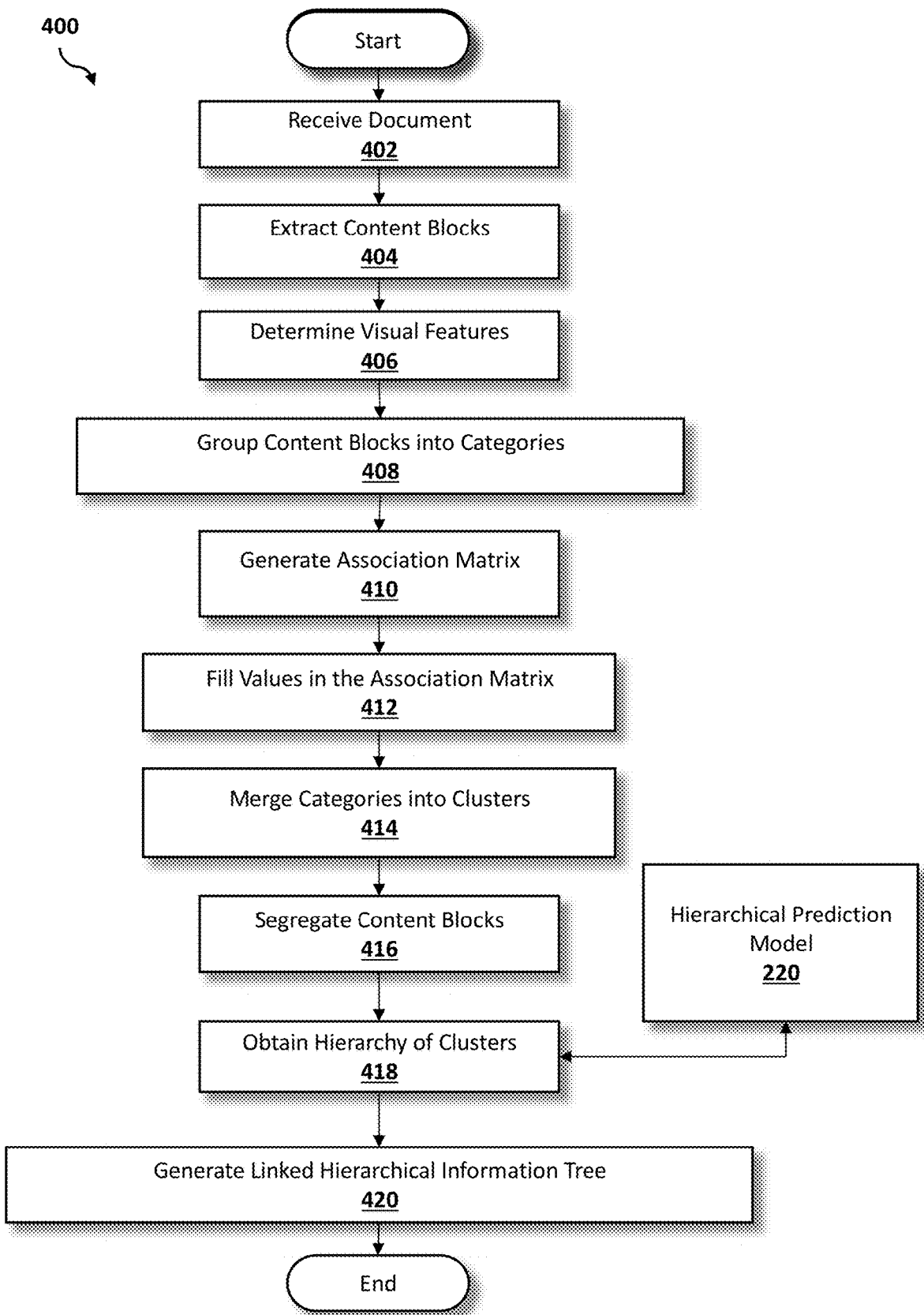
FIG. 4 is an operational flowchart illustrating a process for identifying sections in documents using visual features according to at least one embodiment.

Referring now to FIG. 4, an operational flowchart illustrating the exemplary document section identification process 400 used by the visual-based document identification program 110a and 110b according to at least one embodiment is depicted.

At 402, the document is received into the visual-based document identification program 110a, 110b by the user. Using a software program 108 on the user's device (e.g., user's computer 102), the document may be received as input into the visual-based document identification program 110a, 110b. The document (e.g., emails, publications, instruction manuals, brochures) may include at least one PDF document, expressed in natural language. The document may be uploaded into the visual-based document identification program 110a, 110b to extract the content blocks in the received document.

For example, the user uploads a PDF document on setting up a mobile phone. The following Table 6 shows the text from the PDF document on setting up a mobile phone:

TABLE 6

SECTION 1: GETTING STARTED
This section explains how to start using your phone by first configuring your hardware, activating your service, and then setting up your voicemail.
    Setting Up Your Phone
    Prior to use it is necessary to install both the battery and memory card into their corresponding internal components. The device card slot is also located in this same area.
        1. Remove the back cover by carefully inserting a fingernail or sharp object into the slot on the top side your mobile phone thereby causing the back cover to easily disengage from the rest of the phone.
        2. *CAREFULLY FOLLOW ALL INSTRUCTIONS PROVIDED IN THE FLOW DIAGRAMS ON PAGES 4-9 OF THIS MANUAL TO PREVENT ANY DAMAGE TO THE MOBILE PHONE.*

Next, at 404, the content blocks in the document are extracted from the received document. The content blocks may include textual data (e.g., paragraphs, sections, captions, subtitles) and certain visual data (e.g., images, tables). The visual-based document identification program 110a, 110b may extract the content blocks by utilizing a known external extraction engine.

Continuing the previous example, the content blocks (e.g., B1, B2, B3, B4, B5 and B6) are extracted from the instruction manual provided by the user. The following Table 7 shows the content blocks extracted from the received document:

TABLE 7

SECTION 1: GETTING STARTED } B1
This section explains how to start using your phone by first configuring your hardware, activating your service, and then setting up your voicemail. } B2
    Setting Up Your Phone } B3
    Prior to use it is necessary to install both the battery and memory card into their corresponding internal components. The device card slot is also located in this same area. } B4
        1. Remove the back cover by carefully inserting a fingernail or sharp object into the slot on the top side your mobile phone thereby causing the back cover to easily disengage from the rest of the phone. } B5
        2. *CAREFULLY FOLLOW ALL INSTRUCTIONS PROVIDED IN THE FLOW DIAGRAMS ON PAGES 4-9 OF THIS MANUAL TO PREVENT ANY DAMAGE TO THE MOBILE PHONE.* } B6

Then, at 406, the visual features for the extracted content blocks are determined. Visual features may include various visual attributes related to the textual and visual data (e.g., color, illumination, font size, font type and justification) included within each extracted content block. The visual-based document identification program 110a, 110b may utilize a known visual feature extraction engine to determine the visual features associated with each extracted content block. The visual-based document identification program 110a, 110b may determine the differences between the visual features present in each of the extracted content blocks. The visual-based document identification program 110a, 110b may compile the visual features for each content block into a list, which may be utilized to distinguish each content block from another content block and to determine whether content blocks are similar.

Continuing the previous example, the visual-based document identification program 110a, 110b determines the visual features for each of the extracted content blocks (e.g., B1, B2, B3, B4, B5 and B6). The following Table 8 shows the list of visual features for the extracted content blocks:

TABLE 8

| | |
|---|---|
| B1 | Times New Roman, Font size: 10, Color: Black, Left Alignment, Uppercase Lettering, Bold, Underline, and Colon |
| B2 | Times New Roman, Font size: 10, Color: Black, Left Alignment |
| B3 | Times New Roman, Font size: 10, Color: Black, Left Alignment, Bold |
| B4 | Times New Roman, Font size: 10, Color: Black, Left Alignment |
| B5 | Times New Roman, Font size: 10, Color: Black, Numbering, one word with Bold and Underline |
| B6 | Times New Roman, Font size: 10, Color: Black, Numbering, Uppercase Lettering, Italics |

Then, at 408, the content blocks with identical visual features are grouped into content block categories (e.g., categories). The visual-based document identification program 110a, 110b may determine which of the content blocks include identical visual features. The content blocks with identical visual features may be grouped together into categories by the visual-based document identification program 110a, 110b. Based on the visual features for each extracted content block, the extracted content blocks may be divided into distinct categories. The extracted content blocks with identical visual features may be grouped into the same category, and extracted content blocks with different visual features may be grouped into different categories.

Continuing the previous example, the visual-based document identification program 110a, 110b determines which of the extracted content blocks (e.g., B1, B2, B3, B4, B5 and B6) include identical visual features. Based on the above Table 8 generated by the visual-based document identification program 110a, 110b, both B2 and B4 include identical visual features, which is Times New Roman, Font size: 10, Color: Black, Left Alignment. Therefore, the visual-based document identification program 110a, 110b groups B2 and B4 into the same cluster. The following Table 9 shows the new category groups generated from the identical extracted content blocks:

TABLE 9

| | |
|---|---|
| SECTION 1: GETTING STARTED } C1 | |
| This section explains how to start using your phone by first configuring your hardware, activating your service, and then setting up your voicemail. } C2 | |
| Setting Up Your Phone } C3 | |
| Prior to use it is necessary to install both the battery and memory card into their corresponding internal components. The device card slot is also located in this same area. } C2 | |
| 1. Remove the back cover by carefully inserting a fingernail or sharp object into the slot on the top side your mobile phone thereby causing the back cover to easily disengage from the rest of the phone. } C4 | |
| 2. *CAREFULLY FOLLOW ALL INSTRUCTIONS PROVIDED IN THE FLOW DIAGRAMS ON PAGES 4-9 OF THIS MANUAL TO PREVENT ANY DAMAGE TO THE MOBILE PHONE.* } C5 | |

Then, at 410, the Association Matrix for the content block categories is generated. The Association Matrix may include the comparison between the content block categories based on the closeness score for each category which is generated by the Visual Similarity Measure. The visual-based document identification program 110a, 110b may generate an Association Matrix to compare the closeness between the generated categories in which each generated category may be compared with the other categories generated from the extracted content blocks associated with the received document. The Association Matrix may include the closeness score generated from the Visual Similarity Measure, which compares the closeness between two categories and computes a score associated to the closeness of the two categories. Further details in the generation of the closeness scores by the Visual Similarity Measure will be included below with respect to FIG. 6.

Continuing the previous example, the visual-based document identification program 10a, 110b creates an Association Matrix based on the five clusters (e.g., C1, C2, C3, C4 and C5) formed by the extracted content blocks (e.g., B1, B2, B3, B4, B5 and B6). The block diagram of the exemplary Association Matrix of the content block categories will be described in greater detail below with respect to FIG. 5A.

Then, at 412, values are filled in the generated Association Matrix. The closeness scores generated by the comparison of two categories may be filled into the generated Association Matrix. The visual-based document identification program 110a, 110b may include the closeness score for each category comparison into the generated Association Matrix.

Additionally, the closeness score generated by the Visual Similarity Measure calculation may be computed based on the visual attributes (e.g., either numerical or categorical attributes) of the categories, which are calculated by known mathematical equations (e.g., Euclidean distance, Minkowski distance, or Mahalanobis distance). The operational flowchart illustrating the generation of a Visual Similarity Measure process 600 will be described in greater detail below with respect to FIG. 6.

Continuing the previous example, the five clusters and the visual features were utilized by the Visual Similarity Measure to generate a closeness score for each of the cluster comparisons. The closeness scores are then placed into the Association Matrix at the respective boxes. The block diagram of the exemplary Association Matrix of the content block categories with the closeness score generated by the Visual Similarity Measure will be described in greater detail below with respect to FIG. 5B.

Then, at 414, the categories are merged into clusters. The visual-based document identification program 110a, 110b may perform an unsupervised non-linear clustering to group certain content block categories into clusters based on the closeness score generated by the Visual Similarity Measure. Prior to the start of the visual-based document identification program 110a, 110b, the user may set a threshold value to merge categories that satisfy the threshold value. For example, at the bottom of the screen, there may be a "Threshold" button, when the user clicks on that "Threshold" button, the user may be prompted (via dialog box) to input a threshold value from 1-100, or another range of normalized numbers. Any number entered in the dialog box may be the threshold value in which a closeness score equal to or greater than that entered threshold value may be merged into a cluster. As such, the extracted content blocks may now be mapped into clusters that show the logical similarities between extracted content blocks. The clusters may include extracted content blocks that have substantially similar, rather than identical, visual features based on the closeness score.

Continuing the previous example, the visual-based document identification program 110a, 110b performs the unsupervised non-linear clustering to merge certain categories with high closeness scores into the same cluster. The user previously entered a threshold value of 80 into the visual-based document identification program 110a, 110b. Therefore, a closeness score of 80 or higher would satisfy the threshold value. Based on the Association Matrix, C2 and C4 generates a closeness score of 95, which satisfies the predetermined threshold value. As such, C2 and C4 are merged to form one cluster. The following Table 10 shows the newly formed clusters based on the closeness scores generated by the Visual Similarity Measure:

clusters) may determine the hierarchical connection between each extracted content block, which may be utilized to generate a linked hierarchy representation of the document content (i.e., linked hierarchical information tree).

Continuing the previous example, the hierarchy of the clusters are obtained from the hierarchical prediction model 220. The hierarchy of the clusters includes information on the extracted content blocks included in each cluster, the similarities (i.e., similar visual features) associated with each extracted content block and category and the closeness scores generated from comparing two of the categories. The hierarchical information obtained from the hierarchical prediction model 220 will be utilized to generate a linked hierarchical information tree.

Then, at 420, a linked hierarchical information tree is generated. The visual-based document identification program 110a, 110b may generate a linked hierarchical information tree, which is a pictorial illustration of the extracted content blocks based on the sequential positioning of each extracted content block and the clustering of the extracted content blocks.

Additionally, the generation of the linked hierarchical information tree may include relative cluster font size (e.g., determines the level order of the clusters), location of the cluster (e.g., determines the horizontal positioning of content blocks), and positional location of the cluster (e.g., determines the connection of the content blocks across

TABLE 10

| | |
|---|---|
| SECTION 1: GETTING STARTED } Cluster 1 | |
| This section explains how to start using your phone by first configuring your hardware, activating your service, and then setting up your voicemail. | } Cluster 2 |
| Setting Up Your Phone } Cluster 3 | |
| Prior to use it is necessary to install both the battery and memory card into their corresponding internal components. The device card slot is also located in this same area. | } Cluster 2 |
| 1. Remove the back cover by carefully inserting a fingernail or sharp object into the slot on the top side your mobile phone thereby causing the back cover to easily disengage from the rest of the phone. | } Cluster 2 |
| 2. AREFULLY FOLLOW ALL INSTRUCTIONS PROVIDED IN THE FLOW DIAGRAMS ON PAGES 4-9 OF THIS MANUAL TO PREVENT ANY DAMAGE TO THE MOBILE PHONE. | } Cluster 4 |

Additionally, a block diagram further illustrating the clustering of categories utilizing the Visual Similarity Measure will be described in greater detail below with respect to FIG. 7.

Then, at 416, the content blocks are segregated based on the visual features. The visual-based document identification program 110a, 110b may segregate the extracted content blocks included in each cluster based on the visual features of the extracted content blocks. The segregation of the extracted content blocks for each cluster may be utilized when the visual-based document identification program 110a, 110b generates a linked hierarchical information tree for the received document.

Continuing the previous example, the visual-based document identification program 110a, 110b segregates the extracted content blocks from each of the four clusters. As such, B1 is segregated from Cluster 1, B3 is segregated from Cluster 3, B2, B4 and B5 are segregated from Cluster 2, and B6 is segregated from Cluster 4.

Then, at 418, hierarchy of the clusters are obtained as output of the hierarchical prediction model 220. The hierarchy of the clusters (e.g., hierarchical sequencing of the levels). In the linked hierarchical information tree, the extracted content blocks are organized based on their associated clusters. Each of the extracted content blocks are connected to another extracted content block by a hierarchical connection (e.g., represented by a vertical line) or sequential connection (e.g., represented by a horizontal line). The sequential connections may be extracted content blocks with identical visual features that were merged into the same cluster, and the hierarchical connections may be extracted content blocks associated with different clusters, and the highest closeness scores computed by the Visual Similarity Measure.

Continuing the previous example, the hierarchical information obtained from the hierarchical prediction model 220 and the sequence of the extracted content blocks are combined to build a linked hierarchical information tree. In the linked hierarchical information tree, B1 is located with Cluster 1, B3 is located with Cluster 3, B6 is located with Cluster 4, and B2, B4 and B5 are located with Cluster 2. B2, B4 and B5 are sequentially connected, B5 is hierarchically connected with B6, B1 is hierarchically connected with B2, and B3 is hierarchically connected with B4 and B5. The block diagram of the exemplary illustrative sequential positioning and clustering of the content blocks creating a linked hierarchical information tree will be described in greater detail below with respect to FIG. 7.

In the present embodiment, the visual-based document identification program 110a, 110b may be utilized for various other document formats, including text file formats (e.g., .doc, .rtf), mixed file formats (e.g., .ppt) and HTML.

Figure 5A:
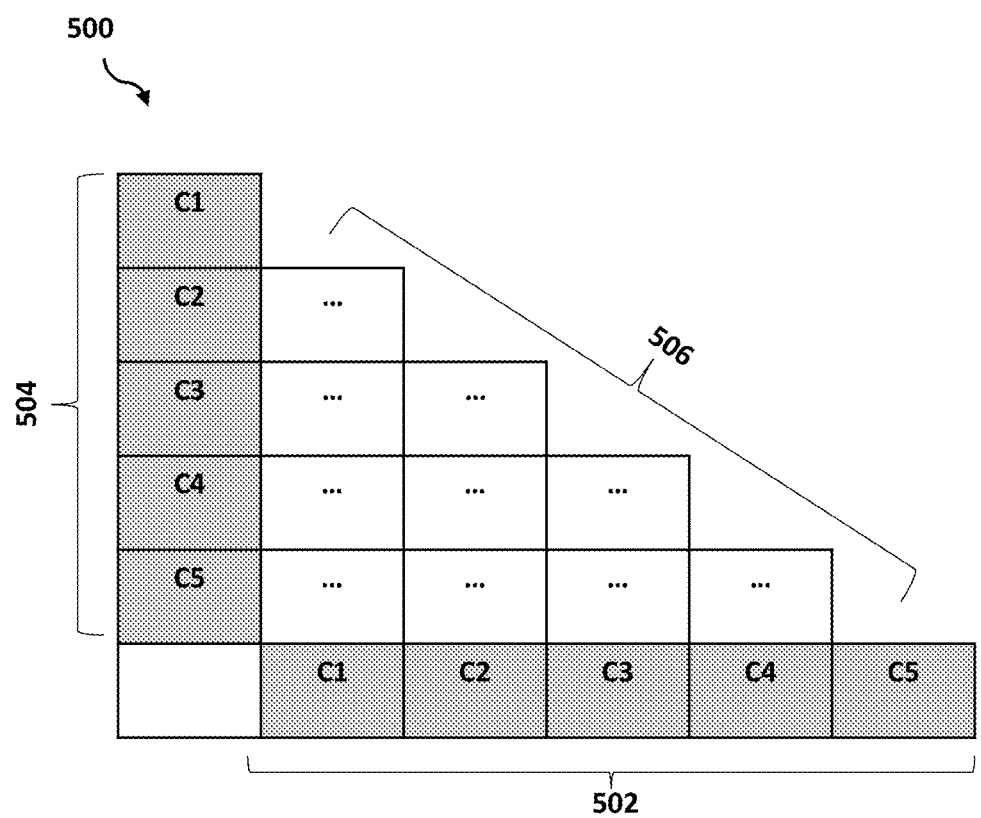
FIG. 5A is a block diagram of an exemplary Association Matrix for the content block categories according to at least one embodiment.

Referring now to FIG. 5A, a block diagram of an exemplary Association Matrix of the content block categories 500 used by the visual-based document identification program 110a and 110b according to at least one embodiment is depicted. As shown, the individual categories (e.g., C1, C2, C3, C4 and C5) are listed on the x-axis 502 and y-axis 504 of the Association Matrix. When generated, the closeness scores between the categories are included in the empty boxes 506 of the Association Matrix.

Figure 5B:
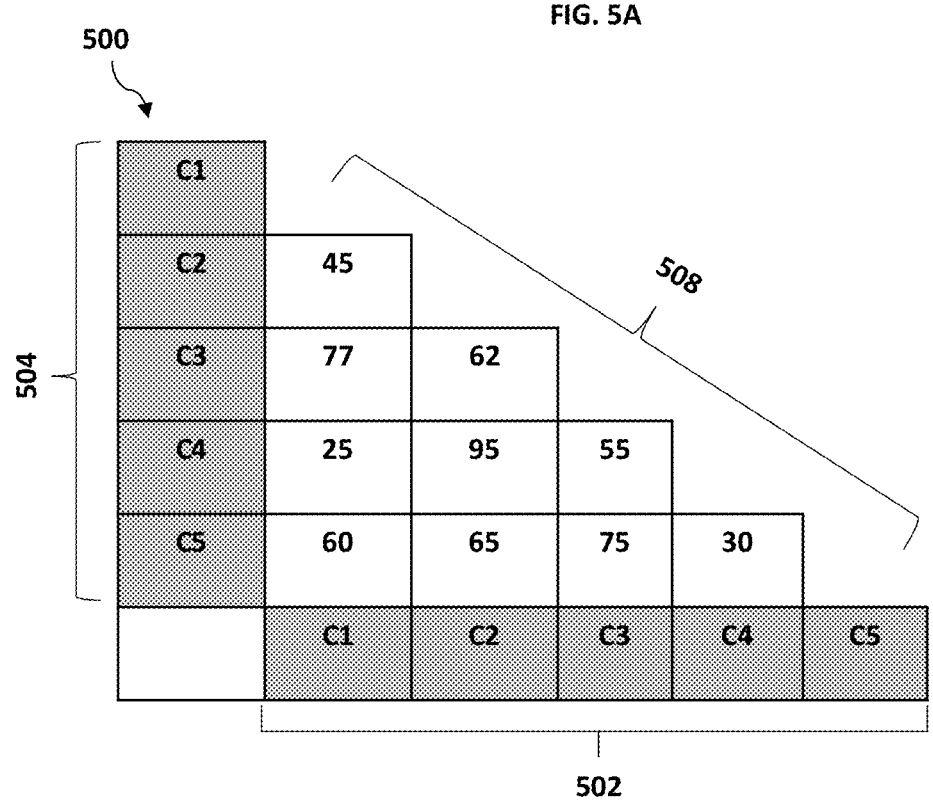
FIG. 5B is a block diagram of an exemplary Association Matrix for the content block categories with the closeness score generated by the Visual Similarity Measure according to at least one embodiment.

Referring now to FIG. 5B, a block diagram of an exemplary Association Matrix of the content block categories with the closeness score generated by the Visual Similarity Measure 500 used by the visual-based document identification program 110a and 110b according to at least one embodiment is depicted. As shown in FIG. 5B, the individual categories (e.g., C1, C2, C3, C4 and C5) are listed at x-axis 502 and y-axis 504 of the Association Matrix, and the closeness score for the respective categories are included in the remaining boxes 508 of the Association Matrix.

The closeness score between C1 and C3 is 77, which is determined by finding the C1 on the x-axis 502 and the C3 on the y-axis 504, and follow each until x-axis 502 and y-axis 504 intersect. The closeness score presented at the intersection, 77, is the closeness score for C1 and C3.

Figure 6:
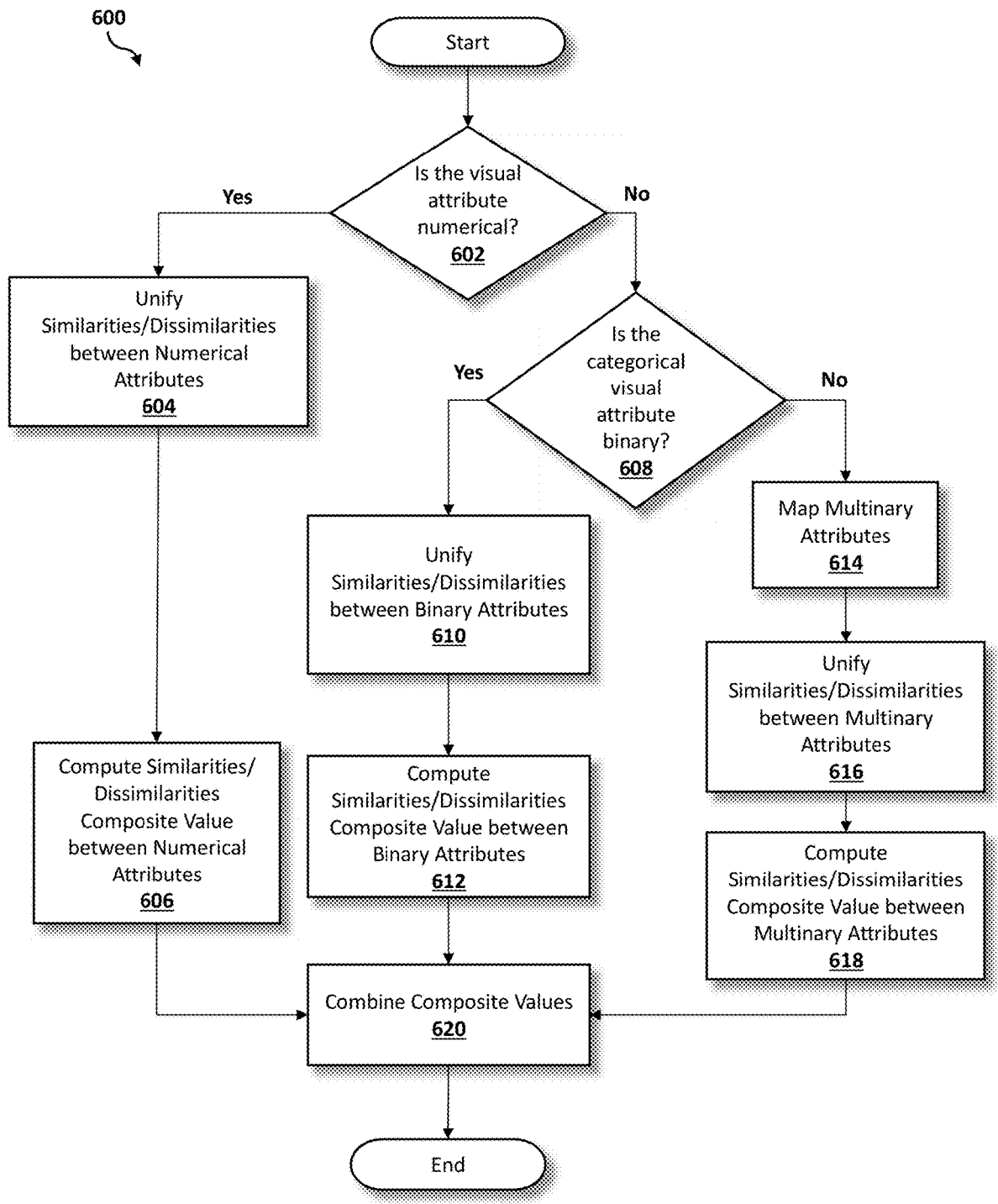
FIG. 6 is an operational flowchart illustrating the generation of a Visual Similarity Measure according to at least one embodiment.

Referring now to FIG. 6, an operational flowchart illustrating the generation of a Visual Similarity Measure process 600 used by the visual-based document identification program 110a and 110b according to at least one embodiment is depicted. As shown, the visual attributes are divided and calculated utilizing known mathematical equations to generate a closeness score between content block categories.

At 602, the Visual Similarity Measure determines whether the visual attributes are numerical. Visual attributes (e.g., color, font size, fonts, bulleting, numbering, alignments and justification) are visual attributes that may differ in each content block category. There may be two general types of visual attributes: numerical and categorical. Numerical visual attributes (e.g., font size and color) may be quantified based on numerical measures, which may be utilized to determine the differences or similarities in each of the content block categories. As such, the Visual Similarity Measure may compare each content block category with another content block category, and determine whether the visual attributes are numerical.

If the Visual Similarity Measure determines that visual attributes are based on numerical visual attributes (i.e., numerical attributes) at 602, then the Visual Similarity Measure may unify the similarities and dissimilarities between the numerical attributes at 604. The Visual Similarity Measure may utilize known mathematical algorithms or measures (e.g., Euclidean distance, Minkowski distance or Mahalanobis distance) to unify the similarities and dissimilarities between the numerical attributes.

For example, the Visual Similarity Measure is comparing two content block categories: C8 and C9. The visual attributes of each content block categories are shown in the following Table 11:

TABLE 11

| C8 | Font size: 10, left alignment, numbering |
| C9 | Font size: 10, left alignment |

Since one of the visual attributes includes a numerical attribute (e.g., font size), then the Visual Similarity Measure may determine that a numerical attribute is present and proceed to unify the similarities and dissimilarities between the numerical attribute of font size in C8 and C9 by utilizing a known measure or algorithm.

Then, at 606, the Visual Similarity Measure computes the composite value of the similarities and dissimilarities between the numerical attributes (i.e., numerical attribute similarities and dissimilarities). The composite value of the similarities and dissimilarities may be defined as the sum of the Euclidean distance between the numerical attributes. The computed composite value (i.e., numerical attribute composite value) may be used as the closeness score between the two compared content block categories.

Continuing the previous example, the Visual Similarity Measure computes the similarities and dissimilarities between the font size in each content block category (e.g., C8 and C9) to generate composite value. Since the font size for both C8 and C9 are identical at 10, then the Visual Similarity Measure calculates a composite value of 100 for this numerical attribute.

If, however, the Visual Similarity Measure determines that the visual attributes are not numerical at 602, then the Visual Similarity Measure determines whether the categorical attributes are binary at 608. Categorical visual attributes (e.g., alignment, justification, numbering and bulleting) may be classified based on categorical measures, which may be utilized to determine the differences or similarities in each of the content block categories. Additionally, there may be two types of categorical attributes: binary and multinary attributes. As such, the Visual Similarity Measure may compare each content block category with another content block category, and determine whether the categorical visual attributes (i.e., categorical attributes) are binary categorical attributes.

If the Visual Similarity Measure determines that the categorical attributes are binary (e.g., numbering or bulleting) at 608, then the Visual Similarity Measure may unify the similarities and dissimilarities between the binary categorical attributes (i.e., binary attributes) at 610. The Visual Similarity Measure may utilize matching or a known Jaccard coefficient to unify the similarities and dissimilarities between the binary attributes (i.e., binary attribute similarities and dissimilarities).

Continuing the previous example, C8 also includes two categorical attributes (e.g., numbering and left alignment). Therefore, the Visual Similarity Measure determines that categorical attributes are present and that one of the categorical attributes (e.g., numbering) is binary. Then, the Visual Similarity Measure unifies the dissimilarities in the binary attribute (e.g., numbering) between C8 and C9 in which numbering is present in C8 and absent in C9 by utilizing the Jaccard coefficient.

Then, at 612, the Visual Similarity Measure computes the composite value of the similarities and dissimilarities between the binary attributes. The composite value of the similarities and dissimilarities may be based on the weighted distance between the binary attributes. The computed composite value (i.e., binary attribute composite value) may be used as the closeness score between the two compared content block categories.

Continuing the previous example, the Visual Similarity Measure utilizes the weighted distance between C8 and C9 in which numbering is present in C8 and absent in C9. The generated composite value is 0 between C8 and C9 for this binary attribute (e.g., numbering).

If, however, the Visual Similarity Measure determines that the categorical attributes are not binary at 608, then the Visual Similarity Measure will map the multinary categorical attributes (i.e., multinary attributes) at 614. The multinary attributes may include alignment and justification in the compared content block categories. The Visual Similarity Measure may map the multinary attributes to multiple dummy binary variables (i.e., a value from 0 to 1 to indicate the presence or absence of some categorical attribute, such as whether or not the visual attribute includes left alignment or not).

Continuing the previous example, both C8 and C9 include another categorical attribute (e.g., left alignment). Therefore, the Visual Similarity Measure determines that the remaining categorical attribute (e.g., left alignment) is multinary. Then, the Visual Similarity Measure maps the multinary attribute (e.g., left alignment) to dummy binary variables in which the presence of left alignment is 1 and the absence of left alignment is 0. Since left alignment is present in both C8 and C9, both obtain a 1.

Then, at 616, the Visual Similarity Measure will unify the similarities and dissimilarities between the multinary attributes (i.e., multinary attribute similarities and dissimilarities). The Visual Similarity Measure may utilize a known hamming distance to unify the similarities and dissimilarities between the multinary attributes.

Continuing the previous example, the Visual Similarity Measure unifies the similarities in the multinary attribute (e.g., left alignment) between C8 and C9 in which left alignment is present in both C8 and C9 by utilizing the hamming distance.

Then, at 618, the Visual Similarity Measure computes the composite value of the similarities and dissimilarities between the multinary attributes. The composite value of the similarities and dissimilarities may be based on the weighted distance between the multinary attributes. The computed composite value (i.e., multinary attribute composite value) may be used as the closeness score between the two compared content block categories.

Continuing the previous example, the Visual Similarity Measure utilizes the weighted distance between C8 and C9 in which left alignment is present in both C8 and C9. The generated composite value is 100 between C8 and C9 for this multinary attribute (e.g., left alignment).

If the Visual Similarity Measure computes the numerical attribute composite value at 606, the binary attribute composite value at 612, or the multinary attribute composite value at 618, then the Visual Similarity Measure combines the composite values for each the visual attributes at 620. The combined composite values for each of the visual attributes may be utilized to generate the overall closeness score between the compared content block categories.

Continuing the previous example, the composite value for the numerical attribute (e.g., font size) is 100, for the binary attribute (e.g., numbering) is 0, and for the multinary attribute (e.g., left alignment) is 100. As such, the overall closeness score between C8 and C9 generated by the Visual Similarity Measure is 67.

In the present embodiment, each comparison of the two content block categories may include numerical and categorical attributes. As such, the Visual Similarity Measure may run each visual attribute, regardless of whether the visual attribute is numerical or categorical, to compute the overall closeness score for the visual attributes included in each compared content block category.

In the present embodiment, the overall closeness score generated by the Visual Similarity Measure may be normalized into one single range, and the weight may be calculated as the standard deviation of numerical attributes.

Figure 7:
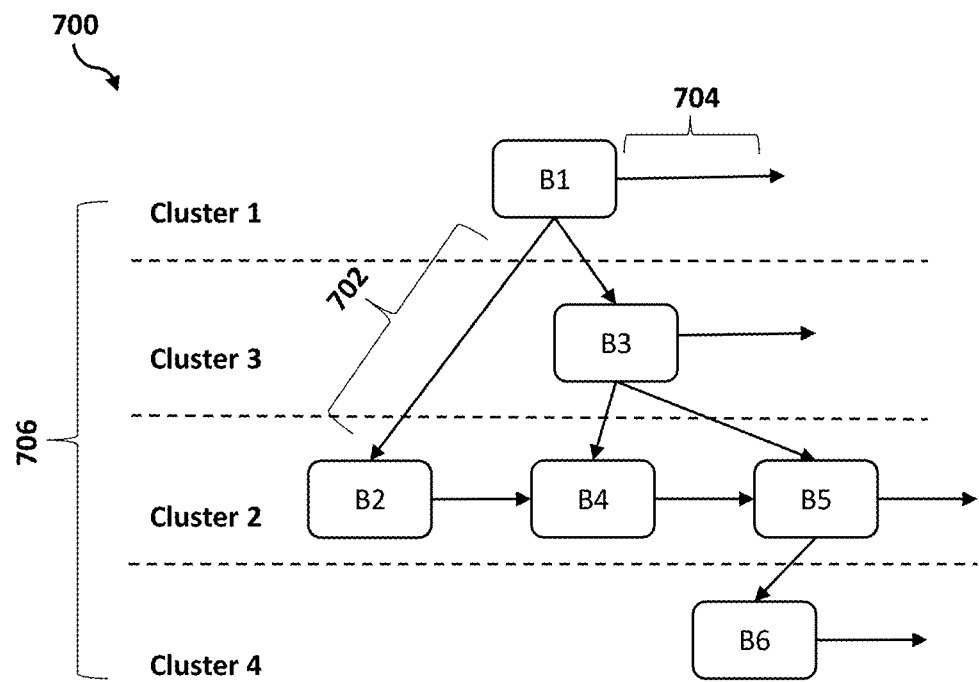
FIG. 7 is a block diagram of an illustrative sequential positioning and clustering of the content blocks creating a linked hierarchical information tree according to at least one embodiment.

Referring now to FIG. 7, a block diagram of an illustrative sequential positioning and clustering of the content blocks creating a linked hierarchical information tree 700 used by the visual-based document identification program 110a and 110b according to at least one embodiment is depicted. As shown, the sequential positioning of the extracted content blocks and the hierarchical clustering of the extracted content blocks are utilized to create the linked hierarchical information tree 700.

Each of the extracted content blocks (e.g., B1, B2, B3, B4, B5 and B6) are connected by vertical lines (e.g., 702) or horizontal lines (e.g., 704). The vertical lines (e.g., 702) are the hierarchical connection between the extracted content blocks and the horizontal lines (e.g., 704) are the sequential connection between the extracted content blocks. Additionally, each of the extracted content blocks were placed in a cluster 706. Therefore, the positioning of the extracted content blocks depends on the cluster 706 associated with the extracted content block. For example, Cluster 2 includes three extracted content blocks, B2, B4 and B5. As such, B2, B4 and B5 were associated with categories that were merged into Cluster 2 based on the closeness score of each comparison.

It may be appreciated that FIGS. 2-7 provide only an illustration of one embodiment and do not imply any limitations with regard to how different embodiments may be implemented. Many modifications to the depicted embodiment(s) may be made based on design and implementation requirements.

Figure 8:
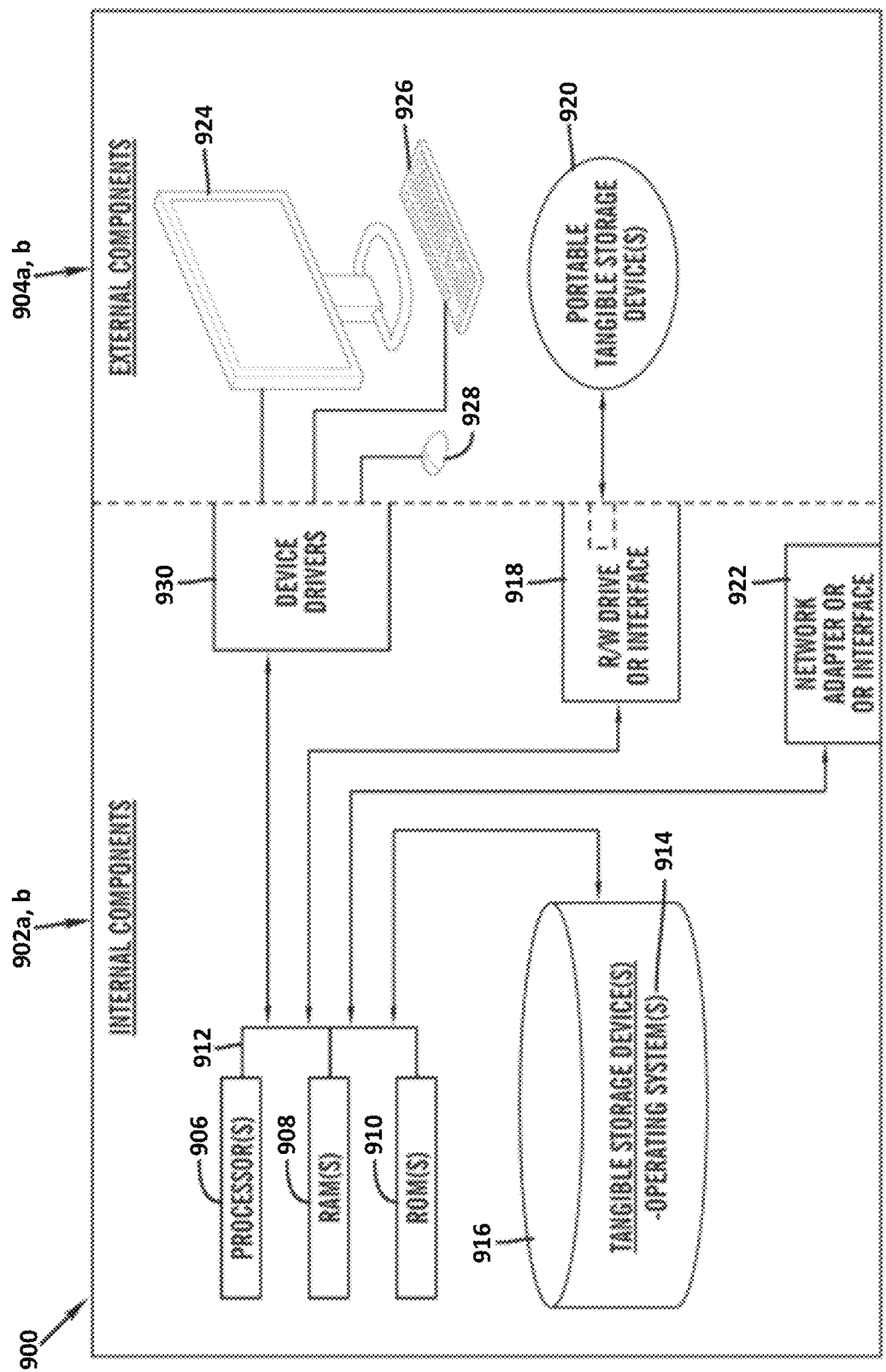
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 8. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the visual-based document identification program 110a in client computer 102, and the visual-based document identification program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visual-based document identification program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the visual-based document identification program 110a in client computer 102 and the visual-based document identification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visual-based document identification program 110a in client computer 102 and the visual-based document identification program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
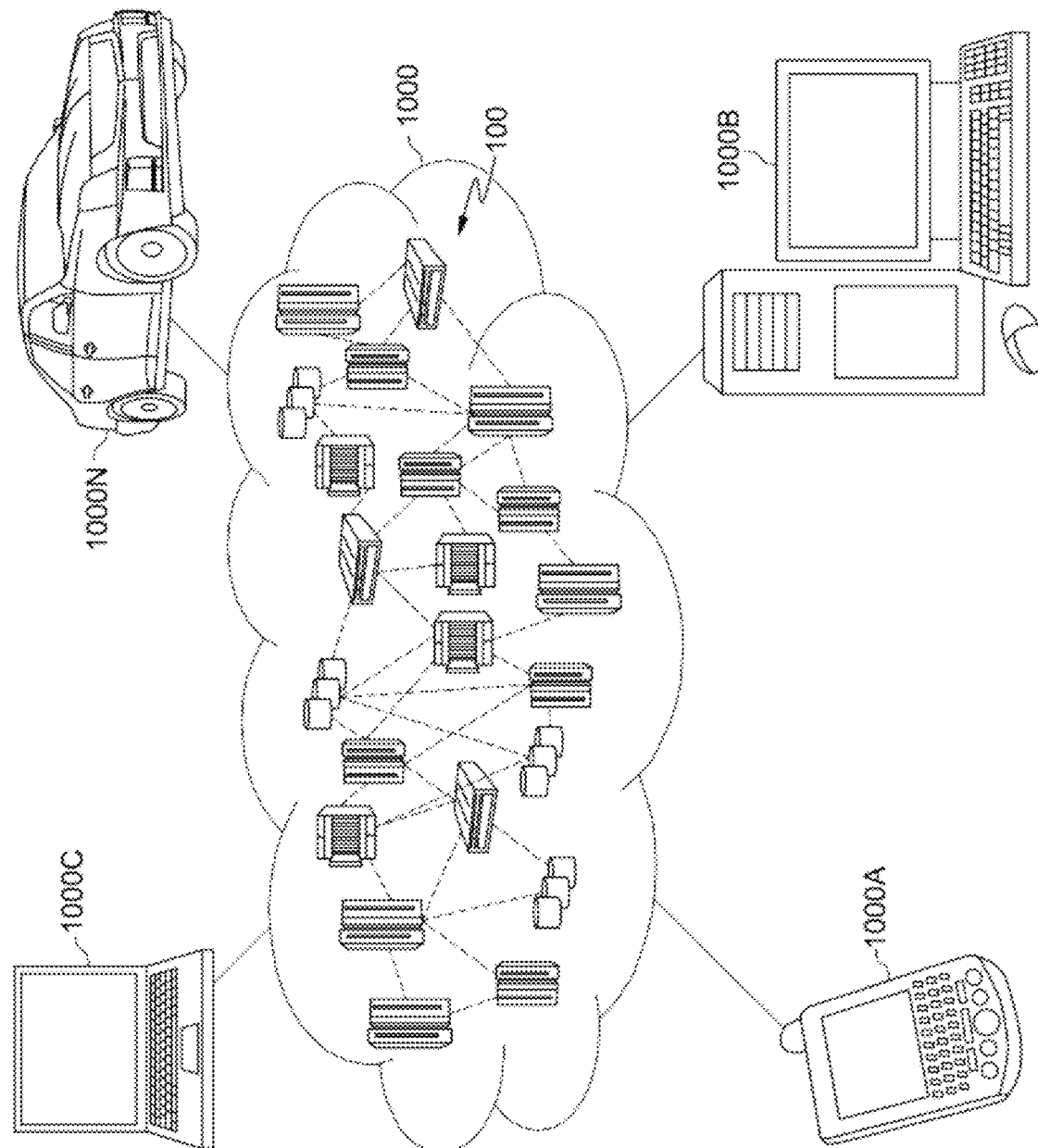
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
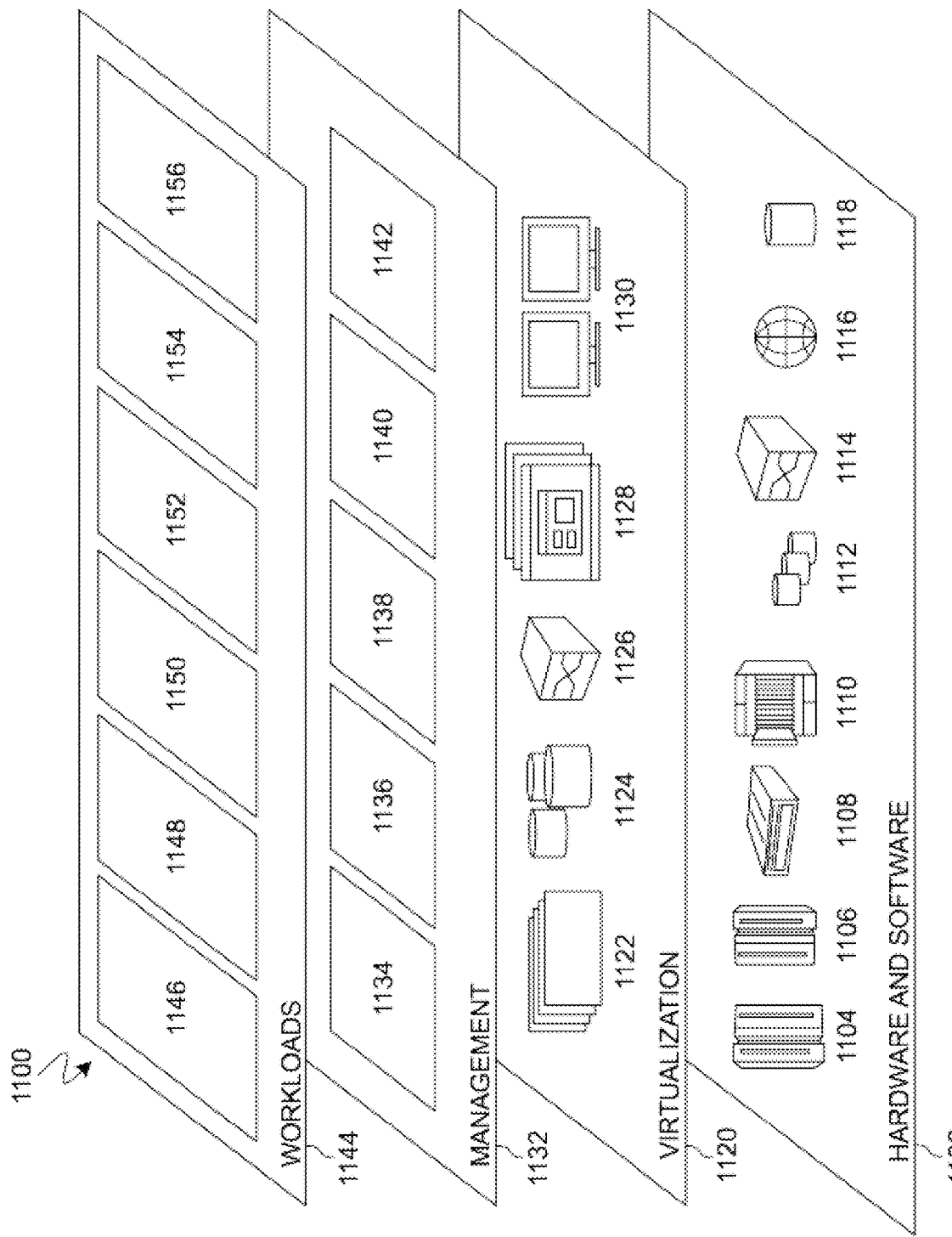
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and visual-based document identification 1156. A visual-based document identification program 110a, 110b provides a way to identify sections in documents using visual features.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying sections in a document based on a plurality of visual features, the method comprising:

receiving a plurality of documents;

extracting a plurality of content blocks based on the received plurality of documents by utilizing an external extracting engine;

determining the plurality of visual features based on the extracted plurality of content blocks;

grouping the extracted plurality of content blocks into a plurality of categories based on the determined plurality of visual features;

generating a plurality of closeness scores for the grouped plurality of categories by utilizing a Visual Similarity Measure, wherein the grouped plurality of categories is compared, wherein a plurality of visual attributes associated with the grouped plurality of categories is determined to include a plurality of numerical attributes, wherein a plurality of similarities and a plurality of dissimilarities between the determined plurality of numerical attributes associated with the grouped plurality of categories is combined, wherein a numerical attribute composite value for each of the numerical attributes in the plurality of numerical attributes is computed;

generating a plurality of Association Matrices associated with the grouped plurality of categories for each of the received plurality of documents based on the Visual Similarity Measure; and merging the grouped plurality of categories into a plurality of clusters.

2. The method of claim 1, further comprising:
segregating the extracted plurality of content blocks from a merged plurality of clusters; and
gathering a hierarchy of the merged plurality of clusters from a hierarchical prediction model.

3. The method of claim 2, further comprising:
identifying a plurality of sequences for the extracted plurality of content blocks.

4. The method of claim 3, further comprising:
combining the retained plurality of sequences for the extracted plurality of content blocks and the hierarchy of the merged plurality of clusters; and
generating a linked hierarchical information tree for each of the received plurality of documents.

5. The method of claim 1, further comprising:
receiving a plurality of training documents;
extracting a plurality of training content blocks based on the received plurality of training documents by utilizing an external extracting engine;
determining the plurality of training visual features based on the extracted plurality of training content blocks;
grouping the extracted plurality of training content blocks into a plurality of training categories based on the determined plurality of training visual features;
generating a plurality of training closeness scores for the grouped plurality of training categories by utilizing the Visual Similarity Measure;
generating a plurality of training Association Matrices on the grouped plurality of training categories for each of the received plurality of training documents based on the Visual Similarity Measure;
merging the grouped plurality of training categories into a plurality of training clusters;
segregating the extracted plurality of training content blocks from the merged plurality of training clusters;
receiving, from the user, a plurality of tags associated with the plurality of training clusters with a plurality of training hierarchical information;
generating a plurality of the tagged training data based on the retrieved plurality of tags on the plurality of training clusters; and
generating a hierarchical prediction model to a hierarchy of the plurality of training clusters.

6. The method of claim 1, wherein grouping the extracted plurality of content blocks into the plurality of categories based on the determined plurality of visual features, further comprises:
comparing each of the determined plurality of visual features associated with the extracted plurality of content blocks;
determining the extracted plurality of content blocks with the same determined plurality of visual features; and
combining the extracted plurality of content blocks with the same determined plurality of visual features into the grouped plurality of categories.

7. The method of claim 1, further comprising:
determining a plurality of visual attributes associated with the grouped plurality of categories includes a plurality of categorical attributes;
determining the plurality of categorical attributes associated with the grouped plurality of categories includes a plurality of binary attributes;
combining a plurality of binary attribute similarities and a plurality of binary attribute dissimilarities between the determined plurality of binary attributes associated with the grouped plurality of categories; and
computing a binary attribute composite value for each of the binary attributes in the plurality of binary attributes.

8. The method of claim 7, further comprising:
determining the plurality of categorical attributes associated with the grouped plurality of categories includes a plurality of multinary attributes;
mapping the determined plurality of multinary attributes by utilizing multiple dummy binary variables;
combining a plurality of multinary attribute similarities and a plurality of multinary attribute dissimilarities between determined plurality of multinary attributes associated with the grouped plurality of categories; and
computing a multinary attribute composite value for each of the multinary attributes in the plurality of multinary attributes.

9. The method of claim 8, further comprising:
combining the numerical attribute composite value, binary attribute composite value and multinary attribute composite value; and
generating a closeness score based on the numerical attribute composite value, binary attribute composite value and multinary attribute composite value.

10. A computer system for identifying sections in a document based on a plurality of visual features, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a plurality of documents;
extracting a plurality of content blocks based on the received plurality of documents by utilizing an external extracting engine;
determining the plurality of visual features based on the extracted plurality of content blocks;
grouping the extracted plurality of content blocks into a plurality of categories based on the determined plurality of visual features;
generating a plurality of closeness scores for the grouped plurality of categories by utilizing a Visual Similarity Measure,
wherein the grouped plurality of categories is compared,
wherein a plurality of visual attributes associated with the grouped plurality of categories is determined to include a plurality of numerical attributes,
wherein a plurality of similarities and a plurality of dissimilarities between the determined plurality of numerical attributes associated with the grouped plurality of categories is combined,
wherein a numerical attribute composite value for each of the numerical attributes in the plurality of numerical attributes is computed;

generating a plurality of Association Matrices associated with the grouped plurality of categories for each of the received plurality of documents based on the Visual Similarity Measure; and merging the grouped plurality of categories into a plurality of clusters.

11. The computer system of claim 10, further comprising:
receiving a plurality of training documents;
extracting a plurality of training content blocks based on the received plurality of training documents by utilizing an external extracting engine;
determining the plurality of training visual features based on the extracted plurality of training content blocks;
grouping the extracted plurality of training content blocks into a plurality of training categories based on the determined plurality of training visual features;
generating a plurality of training closeness scores for the grouped plurality of training categories by utilizing the Visual Similarity Measure;
generating a plurality of training Association Matrices on the grouped plurality of training categories for each of the received plurality of training documents based on the Visual Similarity Measure;
merging the grouped plurality of training categories into a plurality of training clusters;
segregating the extracted plurality of training content blocks from the merged plurality of training clusters;
receiving, from the user, a plurality of tags associated with the plurality of training clusters with a plurality of training hierarchical information;
generating a plurality of the tagged training data based on the retrieved plurality of tags on the plurality of training clusters; and
generating a hierarchical prediction model to a hierarchy of the plurality of training clusters.

12. The computer system of claim 10, wherein grouping the extracted plurality of content blocks into the plurality of categories based on the determined plurality of visual features, further comprises:
comparing each of the determined plurality of visual features associated with the extracted plurality of content blocks;
determining the extracted plurality of content blocks with the same determined plurality of visual features; and
combining the extracted plurality of content blocks with the same determined plurality of visual features into the grouped plurality of categories.

13. The computer system of claim 10, further comprising:
determining a plurality of visual attributes associated with the grouped plurality of categories includes a plurality of categorical attributes;
determining the plurality of categorical attributes associated with the grouped plurality of categories includes a plurality of binary attributes;
combining a plurality of binary attribute similarities and a plurality of binary attribute dissimilarities between the determined plurality of binary attributes associated with the grouped plurality of categories; and
computing a binary attribute composite value for each of the binary attributes in the plurality of binary attributes.

14. The computer system of claim 13, further comprising:
determining the plurality of categorical attributes associated with the grouped plurality of categories includes a plurality of multinary attributes;

mapping the determined plurality of multinary attributes by utilizing multiple dummy binary variables;
combining a plurality of multinary attribute similarities and a plurality of multinary attribute dissimilarities between determined plurality of multinary attributes associated with the grouped plurality of categories; and
computing a multinary attribute composite value for each of the multinary attributes in the plurality of multinary attributes.

15. The computer system of claim 14, further comprising:
combining the numerical attribute composite value, binary attribute composite value and multinary attribute composite value; and
generating a closeness score based on the numerical attribute composite value, binary attribute composite value and multinary attribute composite value.

16. A computer program product for identifying sections in a document based on a plurality of visual features, comprising:
one or more computer-readable storage media and program instructions stored on at least one of the one or more tangible storage media, the program instructions executable by a processor to cause the processor to perform a method comprising:
receiving a plurality of documents;
extracting a plurality of content blocks based on the received plurality of documents by utilizing an external extracting engine;
determining the plurality of visual features based on the extracted plurality of content blocks;
grouping the extracted plurality of content blocks into a plurality of categories based on the determined plurality of visual features;
generating a plurality of closeness scores for the grouped plurality of categories by utilizing a Visual Similarity Measure,
wherein the grouped plurality of categories is compared,
wherein a plurality of visual attributes associated with the grouped plurality of categories is determined to include a plurality of numerical attributes,
wherein a plurality of similarities and a plurality of dissimilarities between the determined plurality of numerical attributes associated with the grouped plurality of categories is combined,
wherein a numerical attribute composite value for each of the numerical attributes in the plurality of numerical attributes is computed;
generating a plurality of Association Matrices associated with the grouped plurality of categories for each of the received plurality of documents based on the Visual Similarity Measure; and
merging the grouped plurality of categories into a plurality of clusters.

17. The computer program product of claim 16, further comprising:
segregating the extracted plurality of content blocks from a merged plurality of clusters; and
gathering a hierarchy of the merged plurality of clusters from a hierarchical prediction model.

18. The computer program product of claim 17, further comprising:
identifying a plurality of sequences for the extracted plurality of content blocks.

* * * * *